US005970720A

United States Patent [19]

Katagiri et al.

[11] Patent Number: 5,970,720

[45] Date of Patent: Oct. 26, 1999

[54] COMBINED REFRIGERATORS AND DETECTING SYSTEM USING THE SAME

[75] Inventors: Masaki Katagiri, Hitachinaka; Yoshii Kobayashi, Naka-machi; Yoshito Taguchi, Tokorozawa; Toshio Uchida, Tanashi, all of Japan

[73] Assignees: Japan Atomic Energy Research Institute; Sumitomo Heavy Industries, Ltd., both of Tokyo, Japan

[21] Appl. No.: 08/501,533

[22] Filed: Jul. 12, 1995

[30] Foreign Application Priority Data

Jul. 15, 1994 [JP] Japan .................................... 6-164010

[51] Int. Cl.[6] .............................. F25B 9/00; F25B 19/00; G01J 5/02

[52] U.S. Cl. .................................. 62/6; 62/51.1; 250/352

[58] Field of Search .......................... 62/6, 51.1; 250/352

[56] References Cited

U.S. PATENT DOCUMENTS

| | | | |
|---|---|---|---|
| 5,107,683 | 4/1992 | Chan et al. | 62/6 |
| 5,111,665 | 5/1992 | Ackermann | 62/6 |
| 5,113,662 | 5/1992 | Fujii et al. | 62/6 |
| 5,275,002 | 1/1994 | Inoue et al. | 62/6 |
| 5,385,010 | 1/1995 | Horn | 62/6 |
| 5,392,607 | 2/1995 | Wu | 62/6 |

FOREIGN PATENT DOCUMENTS 6-13940 2/1994 Japan .

OTHER PUBLICATIONS

J.M. Marler et al; "Operational Characteristics of a High Purity Germanium Photon Spectrometer Cooled By A Closed–Cycle Cryogenic Refrigerator"; Feb. 1973; pp. 522–527; IEEE Transactions on Nuclear Science; vol. NS–20, No. 1.

E. Sakai et al; "Performance of a High–Purity Ge Gamma–Ray Spectrometer System Using a Closed–Cycle Cryogenic Refrigerator"; Feb. 1982; pp. 760–763; IEEE Transactions on Nuclear Science, vol. NS–29, No. 1.

R.E. Stone et al; "Performance of a Gamma–Ray and X–Ray Spectrometer Utilizing Germanium and Si (Li) Detectors Cooled by a Closed–Cycle Cryogenic Mechanical Refrigerator"; Feb. 1986 pp. 299–302; IEEE Transactions on Nuclear Science, vol. NS–33, No. 1.

*Primary Examiner*—Christopher Kilner
*Attorney, Agent, or Firm*—Frishauf, Holtz, Goodman, Langer & Chick, P.C.

[57] ABSTRACT

An electrically cooled detecting system comprises: two or more heat regenerative refrigerators each having a cylinder with a cooling head at its one end; a holder for supporting the two or more heat regenerative refrigerators to dispose the one ends of the cylinders along a certain plane and the other ends of the cylinders on one side of the certain plane; a connector for thermally and rigidly connecting the cooling heads; and a detector being thermally connected to the connector. This system is not necessary to use liquid nitrogen. This system is compact and has a high energy resolution.

18 Claims, 19 Drawing Sheets

SIDE WALL
SINGLE ARRANGEMENT
TWIN ARRANGEMENT
VIBRATION AMPLITUDE (dBV)
FREQUENCY (kHz)

30
11b
11a
13a
13b
22
12a
12b
14
21
17
20
23a
23b
19
16
18
26
15
1

COMBINED REFRIGERATORS AND DETECTING SYSTEM USING THE SAME

BACKGROUND OF THE INVENTION a) Field of the Invention

The present invention relates to a refrigerator, and more particularly to a refrigerator for cooling a detector by using electricity and a detecting system using the refrigerator.

b) Description of the Related Art

A semiconductor radiation detecting system detects radiation while cooling a semiconductor radiation detector. This system is widely used not only for measuring radiation such as gamma rays and X-rays at nuclear reactor facilities but also in other radiation measurement fields such as nuclear physics, astro-physics, and nuclear chemistry.

FIG. 17 shows a semiconductor radiation detecting system of a liquid nitrogen cooling type heretofore used. Liquid nitrogen 103 is filled in a double-walled cooling vessel 102. A cooling rod 104 extends from the inner side wall of the cooling vessel 102 through a pipe 108 and the flange 107 mounted on the outer side wall of the vessel 102. A semiconductor radiation detector 101 is mounted on the front end of the cooling rod 104. A vacuum vessel 105 is hermetically mounted on the flange 107. The cooling rod 104 and semiconductor radiation detector 101 are hermetically housed in the vacuum vessel 105. The semiconductor radiation detector 101 is cooled with the cooling rod 104 to a temperature near a liquid nitrogen temperature.

A preamplifier 106 is placed on the side wall of the pipe 108. A radiation detection signal outputted from the semiconductor radiation detector 101 is supplied via lead wires (not shown) to the preamplifier 106 which amplifies the inputted radiation detection signal and supplies it to a radiation signal processing (acquisition) circuit of the rear stage.

FIG. 18 shows a semiconductor radiation detecting system with closed cycle refrigeration system using an He refrigerator, heretofore used. A compressor 110 is coupled to an isothermal compression part 112 by pipes 111. A cylinder 116 extends from the isothermal compression part 112 into a pipe 113. Mounted on a cooling part 114 at the front end of the cylinder 116 is a buffer 115 to which a semiconductor radiation detector 101 is attached.

A vacuum vessel 105 is coupled to the pipe 113. The semiconductor radiation detector 101, buffer 115, and cylinder 116 are hermetically housed in the vacuum vessel 105. Compressed helium adiabatically expands in the cooling part 114 and cools the cooling part 114 which, in turn, cools the semiconductor radiation detector 101 via the buffer 115.

A preamplifier 106 is placed on the side wall of the pipe 113. Similar to the system shown in FIG. 17, the preamplifier 106 amplifiers a radiation detection signal and it to a radiation detection signal processing (acquisition) circuit of the rear stage.

The semiconductor radiation detecting system of a liquid nitrogen cooling type shown in FIG. 17 uses liquid nitrogen to cool the semiconductor radiation detector. It is necessary for the measurement to prepare liquid nitrogen, it is not easy to use the system, and the installation place is restricted. Since the cooling vessel is used, it is difficult to make the system compact.

The closed cycle He refrigerator shown in FIG. 18 inevitably generates vibrations at the cooling part 114 because of its mechanical structures. Vibrations at the cooling part 114 generates microphonic noises. Microphonic noises deteriorate an energy resolution which is an important performance of the radiation detecting system.

The frequency of microphonic noises covers the frequency range near radiation detection signals. It is therefore difficult to eliminate microphonic noises by using only signal processing techniques. In order to reduce the influence of microphonic noises, the buffer 115 is interposed between the cooling part 114 and semiconductor radiation detector 101 for absorbing vibrations. The buffer 115 is required to be cooled during the measurement, and a large cooling ability is necessary.

SUMMARY OF THE INVENTION

It is an object of the present invention to provide a detecting system using electricity which is not necessary to use liquid nitrogen and has a small size and a high energy resolution.

According to one aspect of the present invention, there is provided a detecting system including: two or more heat regenerative refrigerators each having a cylinder with a cooling head at its one end; a holder for supporting the two or more heat regenerative refrigerators to dispose the one ends of the cylinders along a certain plane and the other ends of the cylinders on one side of the certain plane; a connector for thermally and rigidly connecting the cooling heads; and a detector being thermally connected to the connector.

At least two or more heat regenerative refrigerators are supported by the holder, and one ends of the cylinders are coupled together by the connector made of a material having some rigidity. A polygon is formed by the cylinders, connector, and holder, with or without other members. Each side of the polygon is formed rigidly so that the mechanical strength is made strong to suppress vibrations.

Since a detector is mounted on and supported by the connector, the detector becomes hard to vibrate and is cooled. Therefore, for example, when a semiconductor radiation detector is used as the detector, the energy resolution can be improved.

As described above, it is possible to suppress vibrations of a semiconductor radiation detector and obtain a resolution generally the same as that when liquid nitrogen is used for cooling. Accordingly, the semiconductor radiation detecting system can be used for obtaining a high resolution at the location where liquid nitrogen is not available. A periodical supply of liquid nitrogen is unnecessary so that maintenance becomes easy. The whole cooling system can be made compact.

DETAILED DESCRIPTION OF THE PREFERRED EMBODIMENTS

The structure of a radiation detecting system according to an embodiment of the invention will be described with reference to FIGS. 1A to 1C.

Figure 1A:
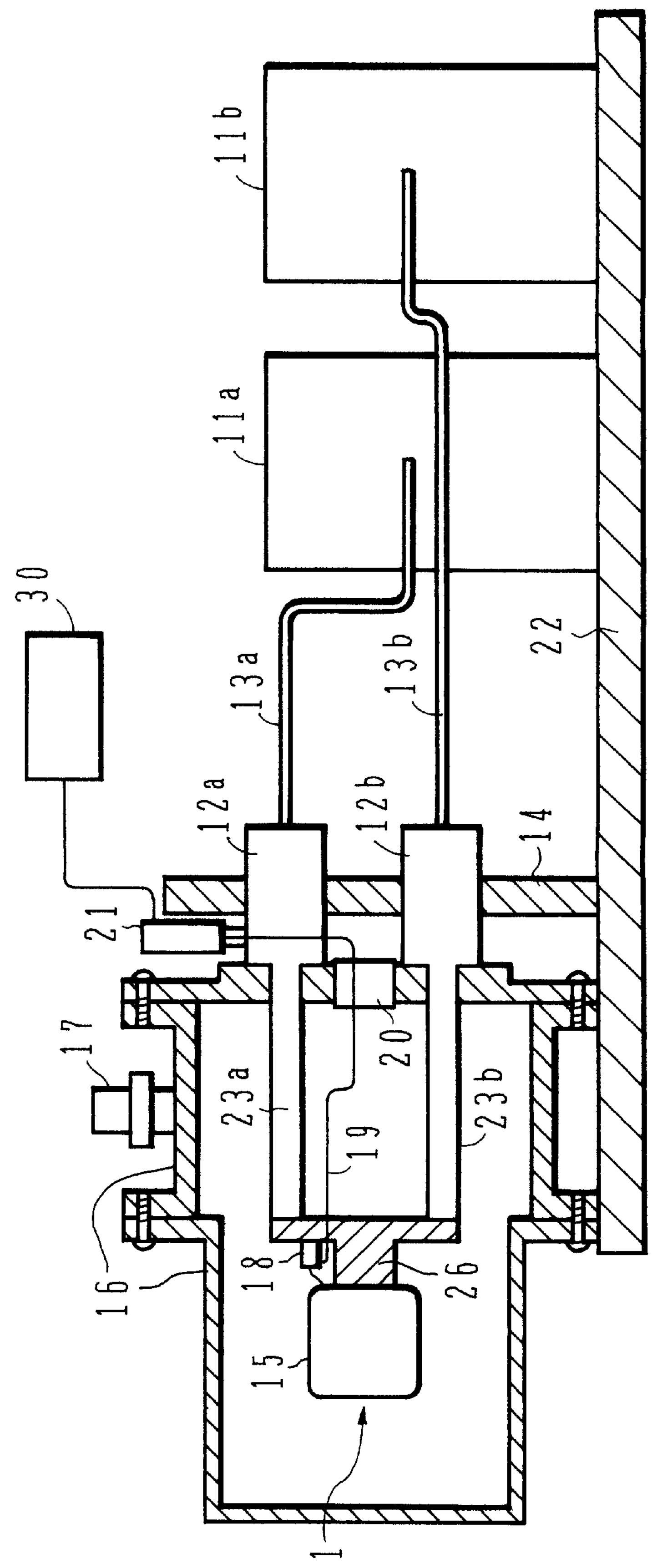
FIGS. 1A to 1C are schematic cross sectional views of a radiation detecting system according to an embodiment of the invention, and a graph showing a gas cycle.

FIG. 1A is a schematic cross sectional view of a radiation detecting system according to an embodiment of the invention. Two Stirling refrigerators are constituted by compressors 11*a* and 11*b*, isothermal compression parts 12*a* and 12*b*, cylinders 23*a* and 23*b* continuously coupled to the isothermal compression parts 12*a* and 12*b*, and connection pipes 13*a* and 13*b* connecting the compressors 11*a* and 11*b* and isothermal compression parts 12*a* and 12*b*.

The compressors 11*a* and 11*b* are mounted on a base 22. A holder 14 and a vacuum vessel 16 are mounted on the base 22 as shown in FIG. 1A. The holder 14 fixes the isothermal compression parts 12*a* and 12*b* of the Stirling refrigerators. The vacuum vessel 16 accommodates the low temperature parts of the Stirling refrigerators and an object to be cooled. Compressed or expanded helium gas is transferred via the connection tubes 13*a* and 13*b* between the compressors 11*a* and 11*b* and isothermal compression parts 12*a* and 12*b*.

As will be later described with reference to FIG. 1B. displacers having a cooling function are inserted into the cylinders 23*a* and 23*b* to define an expansion space between the displacers and the inner front ends of the cylinders 23*a* and 23*b*. The displacers reciprocally move in the right and left directions as viewed in FIG. 1A, in response to the change in the pressure with a phase shift from the phase of compressed helium gas introduced into the isothermal compression parts 12*a* and 12*b*. Helium gas in the expansion space adiabatically expands and cools cooling heads at the front ends of the cylinders 23*a* and 23*b*.

Figure 1B:
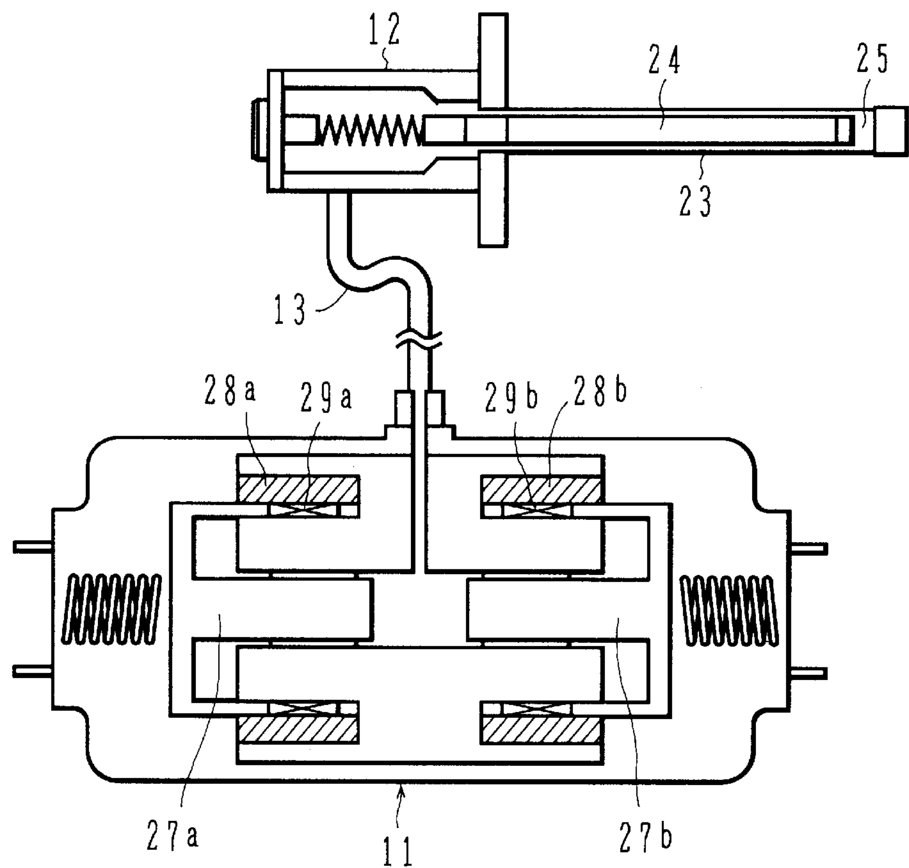

FIG. 1B shows an example of the structure of a stirling refrigerator. An isothermal compression ;part 12 and a cylinder 23 are coupled together to define an inner hermetically sealed space. A displace 24 has a through gas passage filled with coolant an is inserted into the cylinder 23. The displacer 24 is elastically supported at one end of the isothermal compression part 12 by a spring. A connection pipe 13 is connected to the isothermal compression part 12 and supplies a work gas to the isothermal compression part 12, the work gas having a periodically changing pressure. The pressure of the work gas is transmitted from the connection pipe 13 to the isothermal compression part 12, gas passage in the displacer 24, and to the expansion space 25.

A pair of pistons 27*a* and 27*b* is disposed in a compressor 11. The pistons 27*a* and 27*b* facing each other define a compression space therebetween. The pistons 27*a* and 27*b* are driven each moving toward, or away from the other, by a pair of linear motors constituted by permanent magnets 28*a* and 28*b* and moving coils 29*a* and 29*b* fixed to the pistons. The pulsating gas pressure generated in the compression space is transmitted via the connection pipe 13 to the isothermal compression part 12. The isothermal compression part 12 radiates heat to the external space to establish an isothermal gas cycle.

Figure 1C:
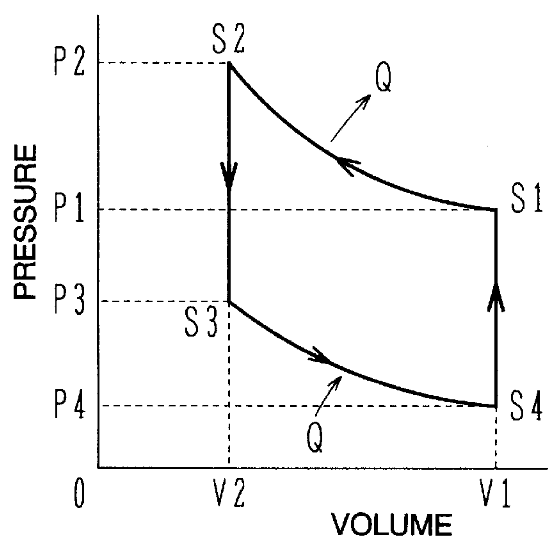

FIG. 1C schematically shows a gas cycle in the expansion space 25. The abscissa represents volume, and the ordinate represents pressure. The change between states S1 and S2 is approximately an adiabatic compression process of emitting heat Q. The change between states S3 and S4 is approximately an adiabatic expansion process of absorbing heat Q. The changes between states S4 and S1 and between states S2 and S3 are approximated to constant volume changes. The heat cycle shown in FIG. 1C is an approximated cycle. In actual system, a volume change occurs also in the changes between states S4 and S1 and between states S2 and S3. General knowledge about Stirling refrigerators can be found in, for example, U.S. Pat. No. 5,255,521 to Watanabe and U.S. patent application Ser. No. 08/397,843 filed on Mar. 2, 1995, which are incorporated herein by reference.

Referring back to FIG. 1A, the cooling heads at the front end portions of the cylinders 23$a$ and 23$b$ are coupled by a connector 26. The connector 26 is T-character shaped and has a linear portion for coupling the cylinders 23$a$ and 23$b$ and a thick portion having a thickness greater than the linear portion and formed generally at the center of the linear portion. On this thick portion, a radiation detector 15 is mounted. The connector 26 is made of a material having a high thermal conductivity such as oxygen free copper specified by JIS-C1020 and aluminum. The semiconductor radiation detector may be a Ge or Si radiation detector.

The semiconductor radiation detector 15, connector 26, and cylinders 23 are hermetically accommodated in the vacuum vessel 16. A vacuum valve 17 is connected to the vacuum vessel 16 to evacuate the inside of the vacuum vessel to a high vacuum degree.

A front stage circuit 18 of preamplifier is mounted on the connector 26 and is electrically connected to the semiconductor radiation detector 15. Signal lines and other wiring lines 19 connected to the front stage circuit 18 of preamplifier are electrically connected via a hermetic seal 20 to a rear stage circuit 21 of preamplifier mounted externally of the vacuum vessel 16. An output signal from the rear stage circuit 21 of preamplifier is supplied to a spectroscopy amplifier 30.

As the semiconductor radiation detector 15, a high purity Ge radiation detector of a closed end type was used which had a diameter of 34 mm, a length of 15 mm, and a capacity of 14 $cm^3$. The Ge radiation detector includes a p-type region, an n-type region, and a p-n Junction between these regions. Stirling refrigerators were used which had a maximum rated AC operating voltage of 15 V, a current rating of 4 A, and a cooling ability of 1.5 W (80 K).

During a compressed gas supply cycle of the compressors 11$a$ and 11$b$, compressed helium gas is supplied via the connection pipes 13$a$ and 13$b$ to the isothermal compression parts 12$a$ and 12$b$. During a gas recovery cycle, the gas is recovered via the same route from the isothermal compression parts 12$a$ and 12$b$ to the compressors 11$a$ and 11$b$. Helium gas is therefore periodically introduced to, and exhausted from, the isothermal compression parts 12$a$ and 12$b$.

As radioactive rays 1 are incident upon the semiconductor radiation detector 15, pairs of electrons and holes are generated corresponding in amount to the energy of the radioactive rays 1. The pairs of electrons and holes are separately picked up by the n-and p-type regions. A radiation detection signal having electric charges corresponding to the energy is therefore generated. This radiation detection signal is supplied to the front stage circuit 18 of preamplifier and amplified. The signal is thereafter amplified by the rear stage circuit 21 of preamplifier and supplied to the spectroscopy amplifier 30.

The Stirling refrigerators were operated at a rated cooling ability, the semiconductor radiation detector was able to be cooled to a liquid nitrogen temperature in one hour and thirty minutes.

Figure 2:
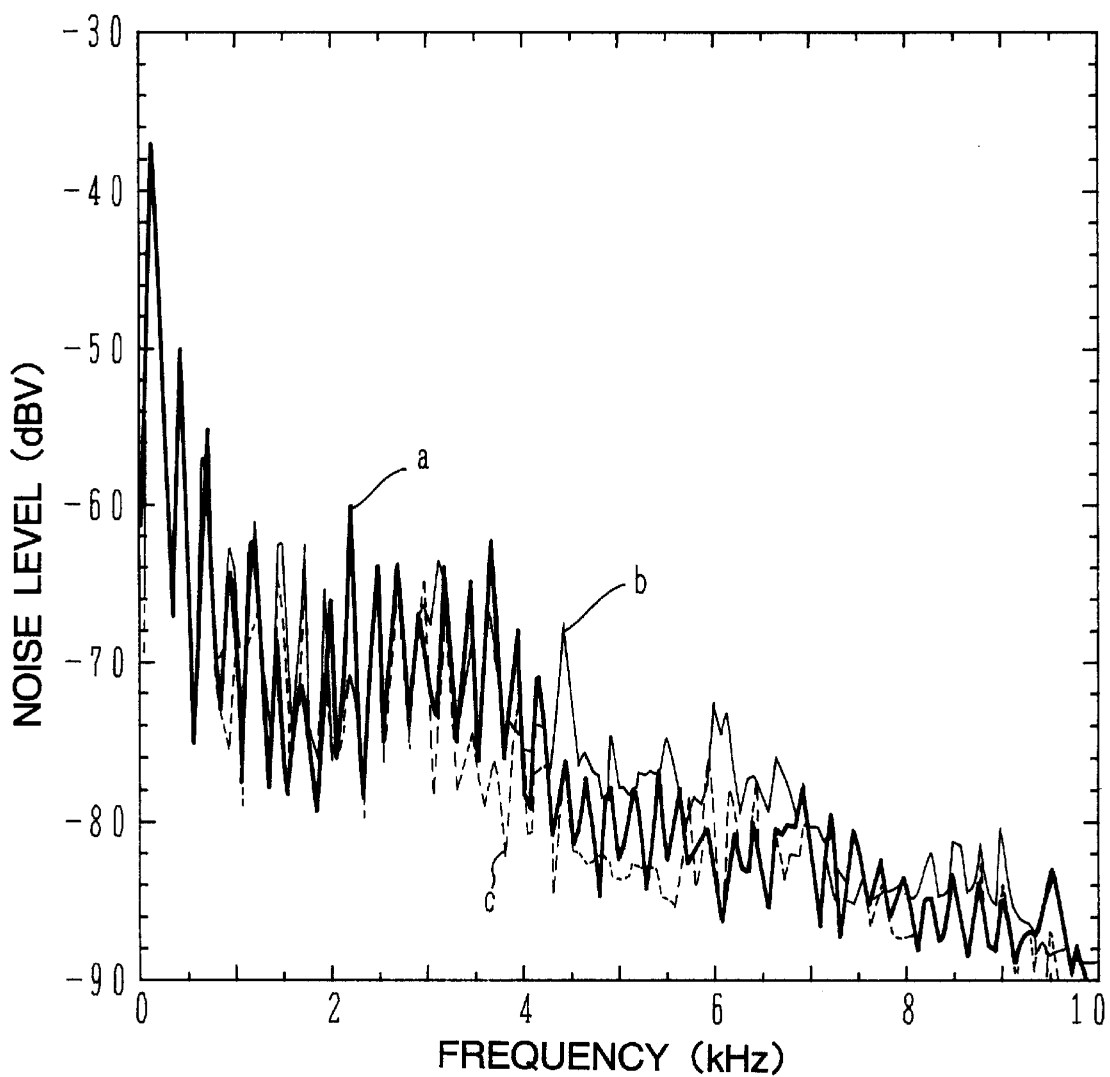
FIG. 2 is a graph showing noise levels of output signals of the radiation detecting system shown in FIGS. 1A and 1B, in comparison to the cases when only one Stirling refrigerator is used and when it is stopped.

FIG. 2 is a graph showing the results of analyzing output signals of the rear stage circuit 21 of preamplifier of the Ge radiation detector shown in FIG. 1A by using a spectrum analyzer. The abscissa represents frequency in the unit of kHz, and the ordinate represents noise level in the unit of dBV. The unit dBV is 20 log (V/Vo) where Vo is a reference voltage of 1.41 V. A bold line a shows a noise level when the Stirling refrigerators of the radiation detecting system shown in FIG. 1A are operated at a rated cooling ability (hereinafter, the arrangement of two Stirling refrigerators in parallel is called a "twin arrangement"). A fine line b shows a noise level when one Stirling refrigerator is used and driven (hereinafter this arrangement is called a "single arrangement") in place of the twin arrangement of FIG. 1A. A broken line c shows a noise level when the cooling heads of the radiation detecting system shown in FIG. 1A are cooled to a predetermined temperature and thereafter the Stirling refrigerators are stopped.

When the Stirling refrigerators are stopped, noises caused by vibrations of the refrigerators are completely eliminated. Therefore, it can be considered that the noise level is equivalent to that when a conventional system cools the semiconductor radiation detector by liquid nitrogen.

As shown in FIG. 2, in the case of the single arrangement of the Stirling refrigerator, microphonic noises of about 10 dB are observed at near 4.5 kHz and 6 kHz as indicated by the fine line b. In the case of the twin arrangement, microphonic noises reduce as indicated by the bold line a, and good results like liquid nitrogen cooling (broken line) are obtained.

Next, referring to FIGS. 4 and 5, the results of measuring a $^{60}$Co standard gamma ray source with the radiation detecting system shown in FIG. 1A will be described. First, a system for analyzing a radiation detection signal will be described with reference to FIG. 3.

Figure 3:
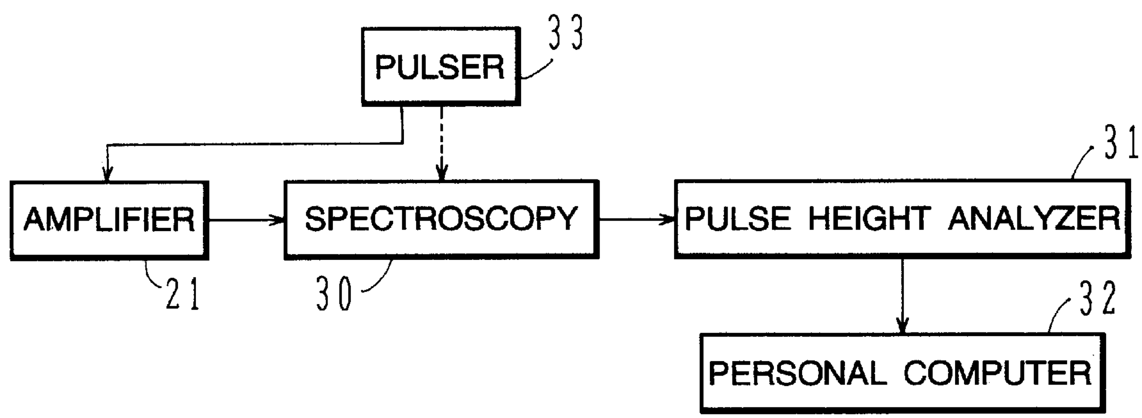
FIG. 3 is a block diagram showing the radiation detection signal analyzing system used by the embodiment shown in FIGS. 1A and 1B.

FIG. 3 is a block diagram of the system for analyzing a radiation detection signal of the radiation detecting system. As shown in FIG. 3, an output signal from the rear stage circuit 21 of preamplifier is supplied to the spectroscopy amplifier 30. The spectroscopy amplifier 30 shapes the waveform of an inputted signal through double integrations and double differentiations at a predetermined waveform shaping time constant to cut background noises and pick up only the signal components as much as possible. The signal is then supplied to a pulse height analyzer 31. A time during which pairs of electrons and holes are generated by radioactive rays is very short, and a detection signal is characterized by a charge amount generated in a predetermined time period, i.e., by a pulse height.

The pulse height analyzer 31 analyzes the pulse heights of an inputted signal, distributes them to channels preset for each pulse height to update the contents of a counter of each channel. An output signal from the pulse height analyzer 31 is supplied to a personal computer 32 and is processed. The number of channels used was 4096, and the 4096-th channel was set to correspond to a pulse height of about 10 V.

A pulser 33 supplies constant standard pulse signals as pseudo signals for the radiation detection signal, to the preamplifier 21. The pulser 33 may alternatively supply the signals to the spectroscopy amplifier 30. These signals are used for the measurement of a limit in a resolution of only the signal analyzing system, or other factors.

Figure 4:
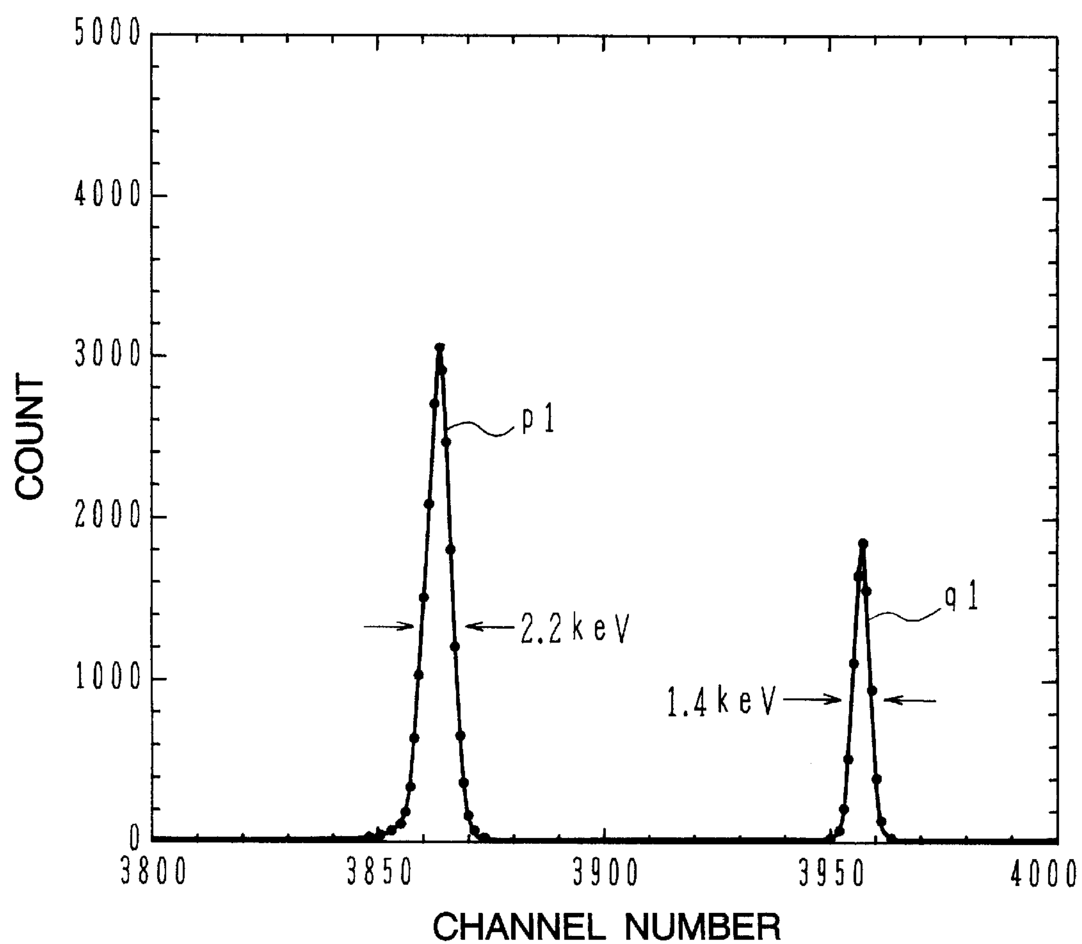
FIG. 4 is a graph showing gamma ray spectra detected by the radiation detecting system shown in FIGS. 1A and 1B.

FIG. 4 shows spectra of standard gamma rays of 1.3 MeV and pulser signals. A Ge radiation detector of a closed end type was used as the semiconductor radiation detector. The Stirling refrigerators were driven at 12 V, and the waveform shaping time constant of the spectroscopy amplifier was set to 2 $\mu$sec.

A peak p1 of a gamma ray spectrum appears near at the channel No. 3863, and a peak p2 of the pulser signal spectrum appears near at the channel No. 3957. The full width at half maximum (FWHM) of the gamma ray spectrum p1 was 2.2 keV, and that of the pulser signal spectrum p2 was 1.4 keV. In the single arrangement of the Stirling refrigerator, FWHM of the gamma ray spectrum was 2.6 keV, and that of the pulser signal spectrum was 1.9 keV. When the measurement was made after the Stirling refrigerators were stopped, FWHM of the gamma ray spectrum was 2.2 keV, and that of the pulser signal spectrum was 1.5 keV.

It is noted that the twin arrangement of the Stirling refrigerators improves an energy resolution more than the single arrangement. It has been found that the twin arrangement provides an energy resolution generally equal to that when the measurement is made after the Stirling refrigerators are stopped.

Figure 5:
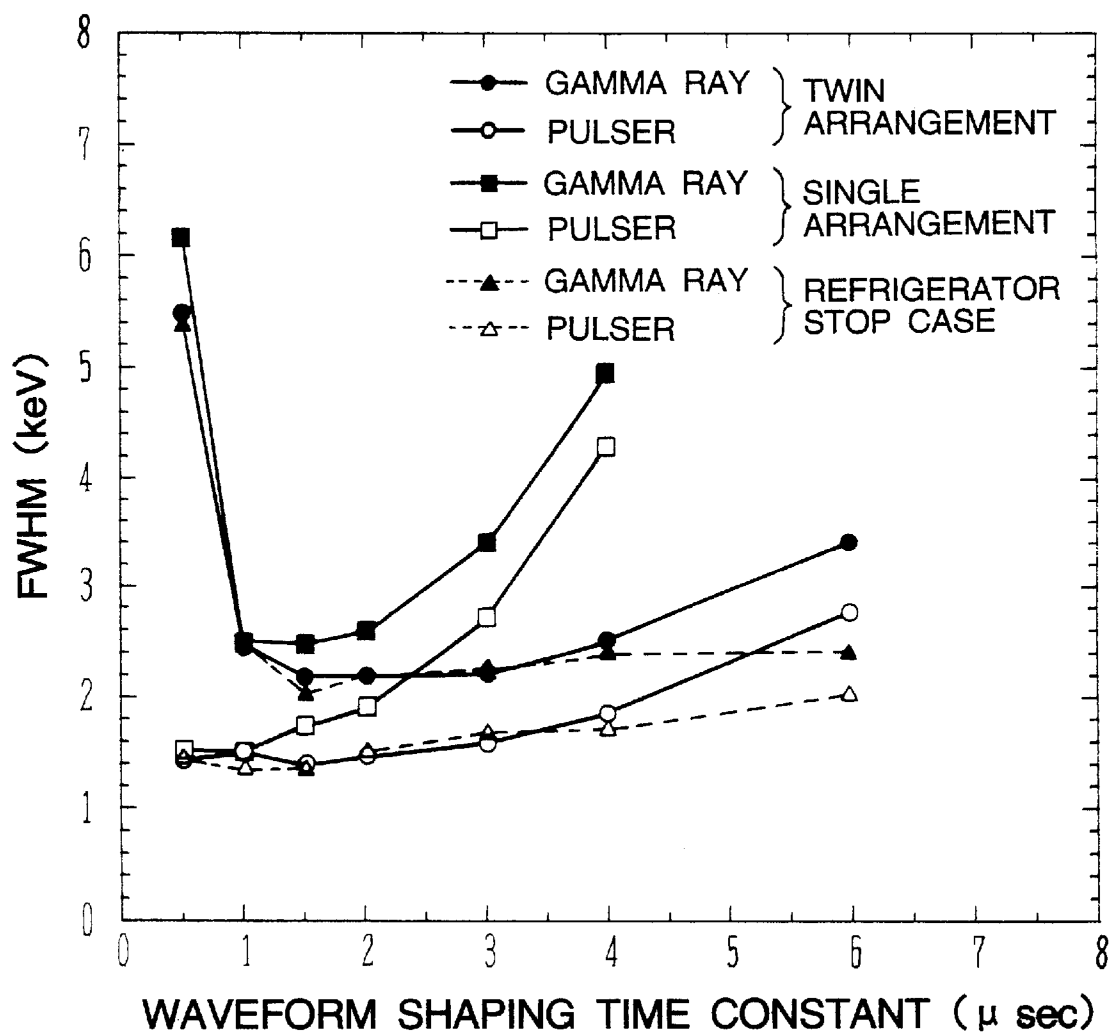
FIG. 5 is a graph showing full widths at half maximum (FWHM) of gamma ray spectra and pulser signal spectra, respectively when one Stirling refrigerator is used and when two Stirling refrigerators are used.

FIG. 5 shows full widths at half maximum obtained when the waveform shaping time constant is changed. The abscissa represents a waveform shaping time constant in the unit of μsec, and the ordinate represents a full width at half maximum of a spectrum in the unit of keV. Black circles, squares, and triangles represent full widths at half maximum of gamma ray spectra, respectively for the twin arrangement, signal arrangement, and refrigerator stop case. White circles, squares, and triangles represent full widths at half maximum of pulser signal spectra, respectively for the twin arrangement, signal arrangement, and refrigerator stop case.

The drive voltages of the Stirling refrigerators in the twin arrangement and single arrangement were set to 15 V and 11 V, respectively. As the radiation detector, a Ge radiation detector of a closed end type having a capacity of 14 $cm^3$ was used.

In the case of the single arrangement, a resolution equivalent to the refrigerator stop case can be obtained only at the waveform shaping time constant of about 1 μsec, and rapidly lowers (becomes bad) at the waveform shaping time constant of 2 μsec or longer. In contrast, in the case of the twin arrangement, a resolution generally equivalent to the refrigerator stop case can be obtained in the range of the waveform shaping time constant of 4 μsec or shorter. A relatively good resolution can be obtained even at the waveform shaping time constant of 6 μsec although the resolution lowers slightly.

At the waveform shaping time constant of 0.5 μsec, the resolution of a gamma ray spectrum lowers considerably. The reason for this can be given as follows. It takes a certain time, for pairs of electrons and holes generated upon incidence of radioactive rays, to be separated by depletion layers near the p-n Junction and detected as an electrical signal at the electrodes. Since the waveform shaping time constant of 0.5 μsec is too short, not all current generated upon incidence of radioactive rays can be analyzed.

The twin arrangement of the Stirling refrigerators provides a good resolution equivalent to the refrigerator stop case in the wide range of the waveform shaping time constant. Improvement of the resolution by the twin arrangement may be considered as resulting from a reduction of microphonic noises caused by a difficulty of vibrations of the radiation detector because of the increased mechanical strength of the mount of the detector. Vibrations in the twin and single arrangements will be described next.

Figure 6A:
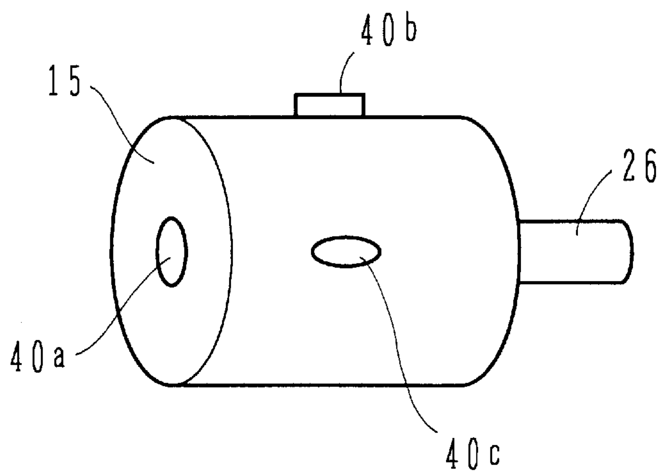
FIGS. 6A and 6B are a perspective view of the semiconductor radiation detector showing the positions of acceleration sensors for measuring vibrations of the detector of the radiation detecting system shown in FIGS. 1A and 1B, and a block diagram showing a system for analyzing output signals of the acceleration sensors.
Figure 6B:
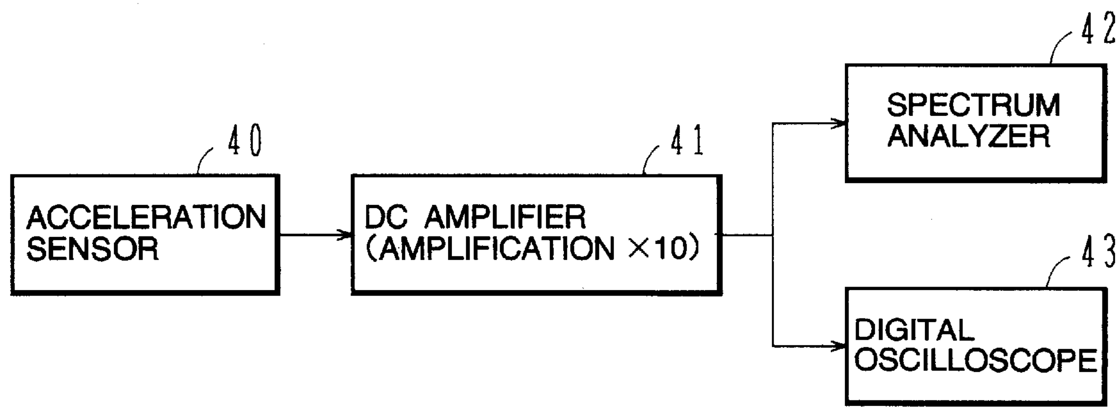

FIGS. 6A and 6B illustrate a vibration measuring apparatus and a block diagram showing a system for analyzing output signals of the acceleration sensors.

As shown in FIG. 6A, acceleration sensors 40_a_, 40_b_, and 40_c_ are mounted on the front end, top wall, and side wall of a closed end type Ge radiation detector. Vibrations in these three directions were measured.

As shown in FIG. 6B, output signals from the acceleration sensors 40 were inputted to a DC amplifier 41 and amplified at an amplification factor of 10. The amplified signals were observed by a digital oscilloscope 48 in real time, and analyzed by a spectrum analyzer 42.

Figure 7:
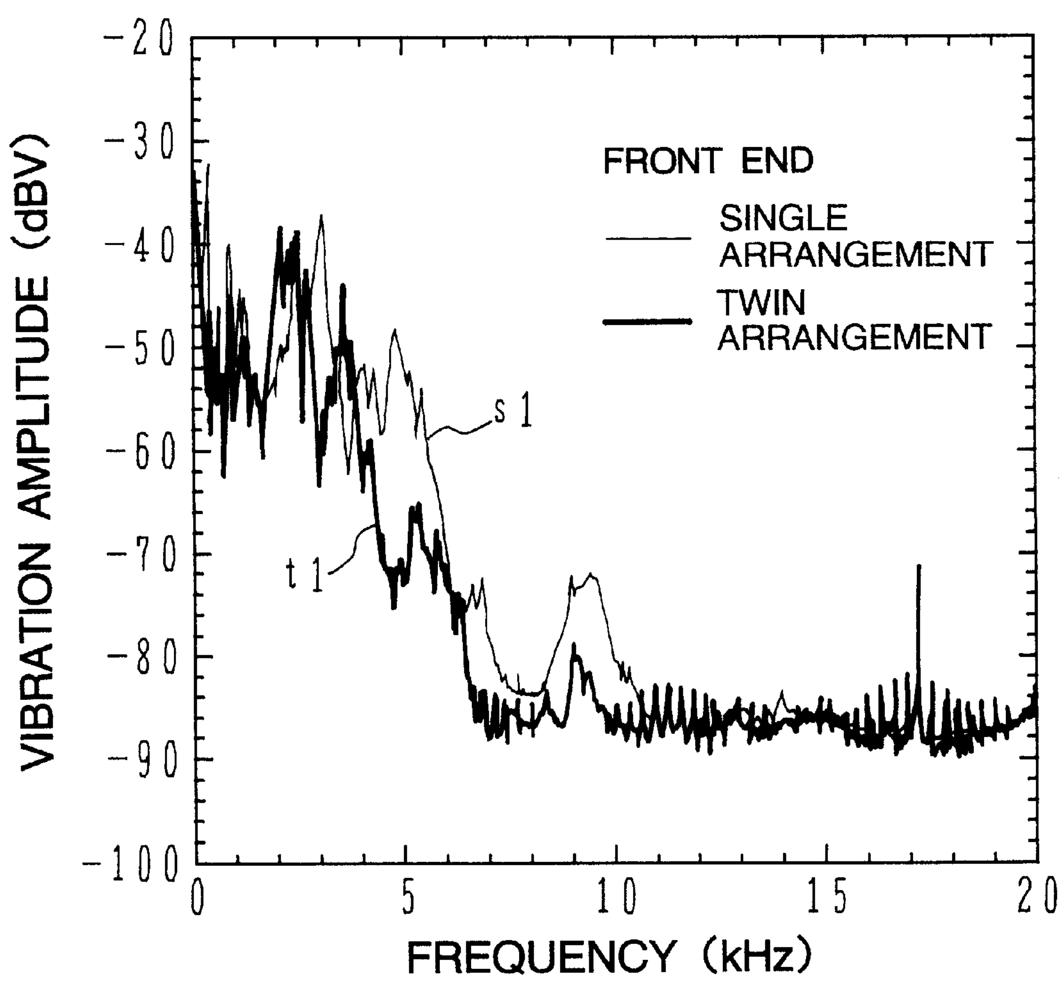
FIG. 7 is a graph showing the amplitudes of vibrations detected by the acceleration sensor mounted on the front end of the semiconductor radiation detector of the system shown in FIGS. 1A and 1B, in comparison to the case of using one refrigerator.
Figure 8:
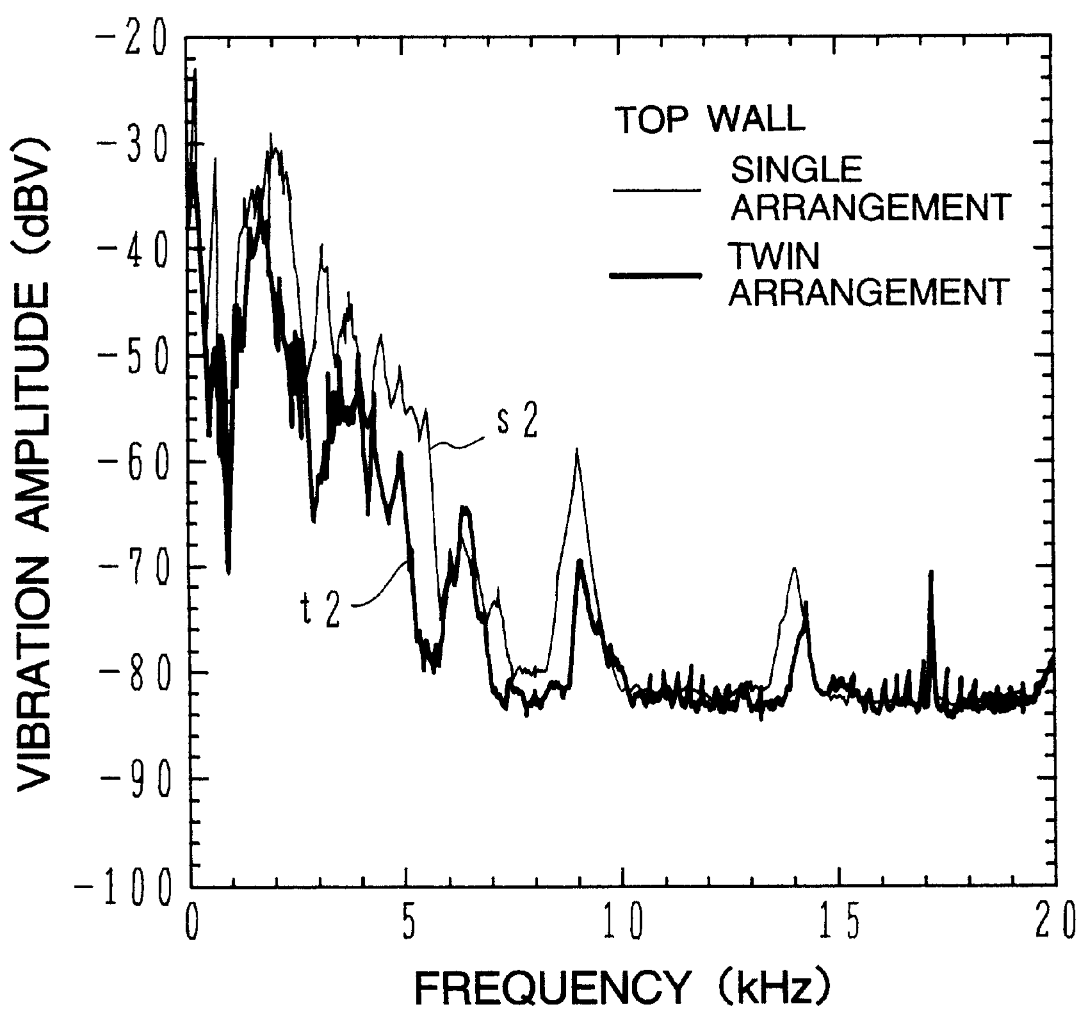
FIG. 8 is a graph showing the amplitudes of vibrations detected by the acceleration sensor mounted on the top wall of the semiconductor radiation detector of the system shown in FIGS. 1A and lB, in comparison to the case of using one refrigerator.
Figure 9:
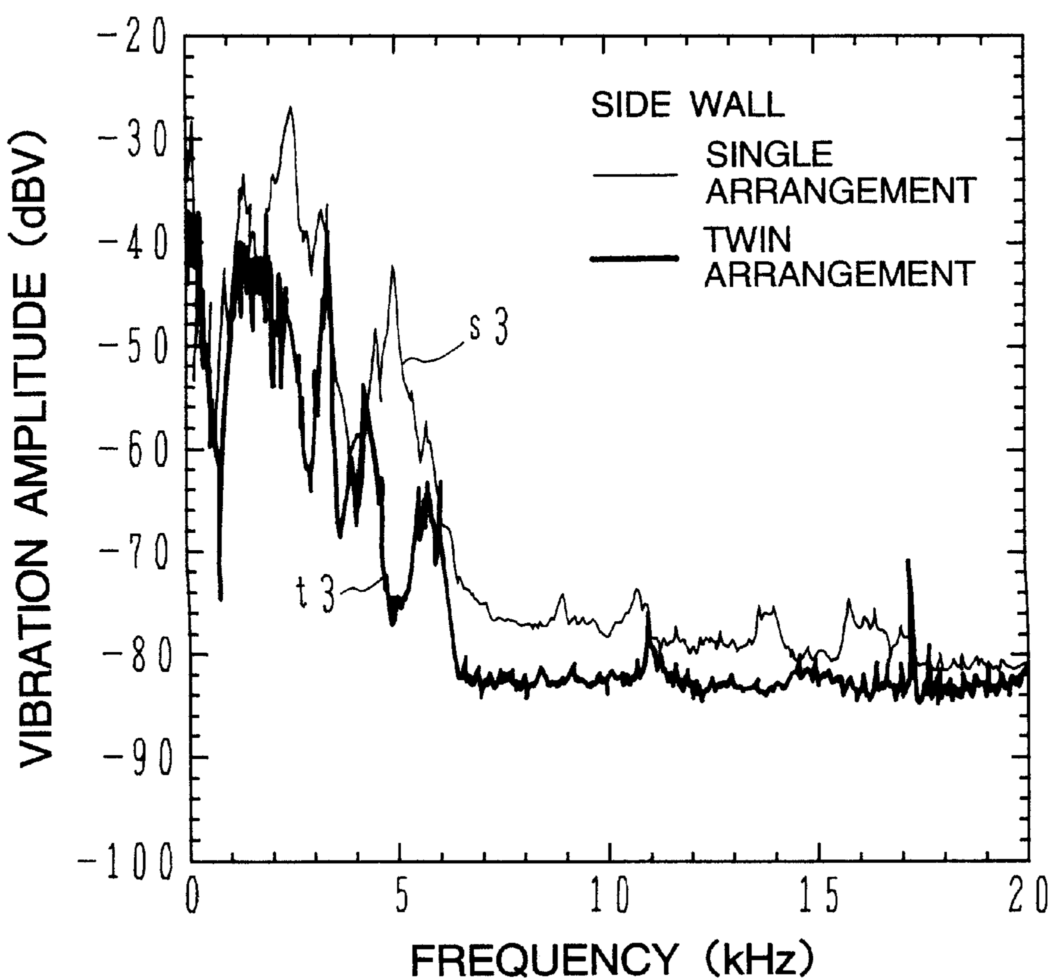
FIG. 9 is a graph showing the amplitudes of vibrations detected by the acceleration sensor mounted on the side wall of the semiconductor radiation detector of the system shown in FIGS. 1A and 1B, in comparison to the case of using one refrigerator.

FIGS. 7 to 9 are graphs showing the amplitudes of vibrations detected by the acceleration sensors mounted on the front end, top wall, and side wall of the Ge radiation detector. Each abscissa represents vibration frequency in the unit of kHz, and each ordinate represents an output of the DC amplifier in the unit of dBV and corresponds to the amplitude of vibrations. Curves t designate twin arrangement, and curves s designate single arrangement. Numeral 1 attached to the letter designates front end, numeral 2 designates top wall, and numeral 3 designates side wall.

As shown in FIGS. 7 to 9, in all the cases of the acceleration sensors mounted on the front end, top wall, and side wall of the Ge radiation sensor, the amplitude of vibration reduces as the vibration frequency increases in the range of about 7 kHz and higher, and the amplitude of vibration is small in the range of about 7 kHz or higher although a resonance is locally observed.

In the twin arrangement, the mechanical vibration levels at the three positions are generally the same. In the single arrangement, the vibration levels detected by the acceleration sensors at the top wall and side wall are larger by about 10 dBV than that detected by the acceleration sensor at the front end. This is considered that from the mechanical point of view, the single arrangement is hard to suppress transverse vibrations orthogonal to the longitudinal direction, whereas transverse vibrations are hard to be generated in the twin arrangement.

The amplitudes of vibrations are smaller in the twin arrangement in the range of all vibration frequencies than in the single arrangement.

In this way, mechanical vibrations of the radiation detector can be suppressed in the twin arrangement. It is thus possible to prevent the resolution from being lowered by microphonic noises.

In the above embodiment, the cooling heads of two Stirling refrigerators are coupled by the connector of a T-character shape. A connector of a different shape may also be used so long as it can suppress vibrations. Examples of other connectors having a different shape will be described.

Figure 10A:
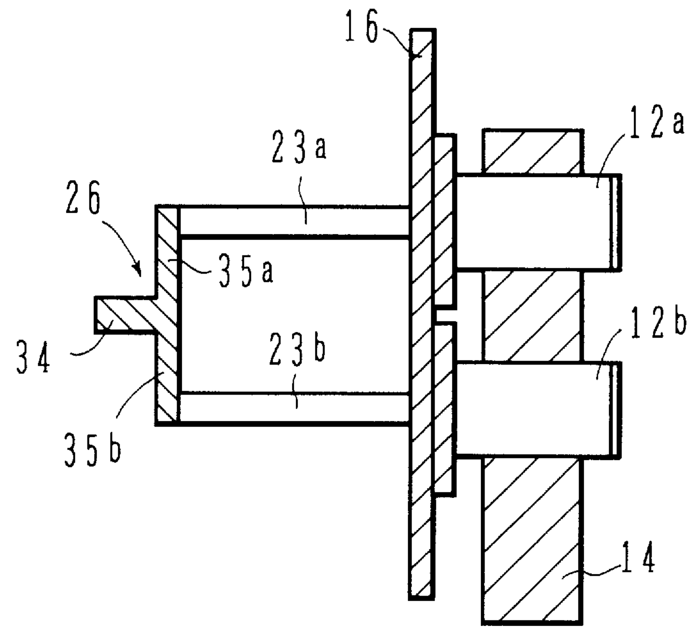
FIGS. 10A and 10B are schematic cross sectional views of Stirling refrigerators and a connector for connecting the cooling heads, illustrating the shape of the connector.
Figure 10B:
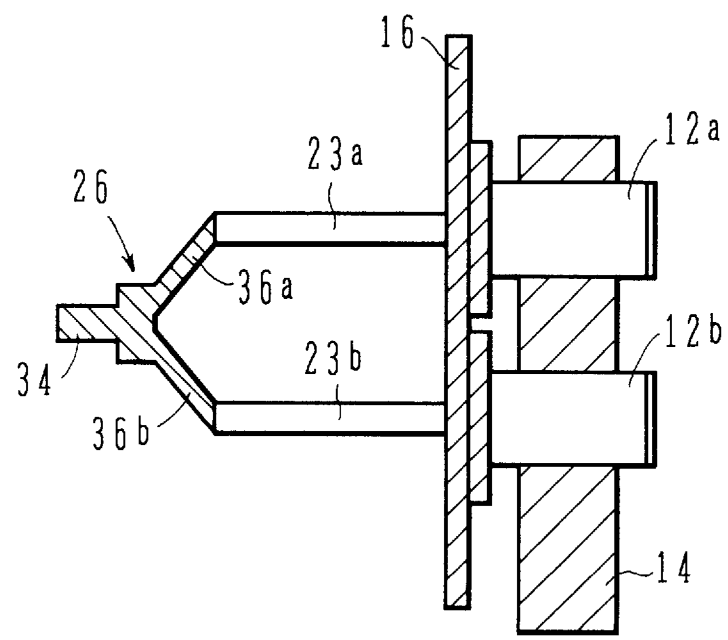

FIGS. 10A and 10B are schematic cross sectional views, each showing the cylinders of Stirling refrigerators and a connector connecting the cooling heads of the cylinders. In the example shown in FIG. 10A, a connector 26 having a T-character shape same as the radiation detecting system shown in FIG. 1A is mounted on the cooling heads of the cylinders 23_a_ and 23_b_. From another point of view, a pair of linear elbows 35_a_ and 35_b_ connect a cooling buffer 34 and the cooling heads of the cylinders 23_a_ and 23_b_, and extend on one linear line. In the example shown in FIG. 10B, a connector 26 having a Y-character shape is mounted. As shown in FIG. 10B, the connector has two linear portions 36_a_ and 36_b_ and a rod portion 34. The two linear portions 36_a_ and 36_b_ are disposed along two slanted sides of an equilateral triangle whose ends of the bottom side are located at the cooling heads of the two cylinders. The rod portion 34 extends from the apex of the two slanted sides of the equilateral triangle.

It will be apparent for those skilled in the art that similar arrangements can be employed for connecting three or more cylinders. That is to say, an end of a cooling buffer or rod is connected to a plurality of cooling heads of cylinders with respective linear elbows.

Next, the results of measuring the resolutions will be described when the connectors 26 having the T-and Y-character shapes are used.

Figure 11:
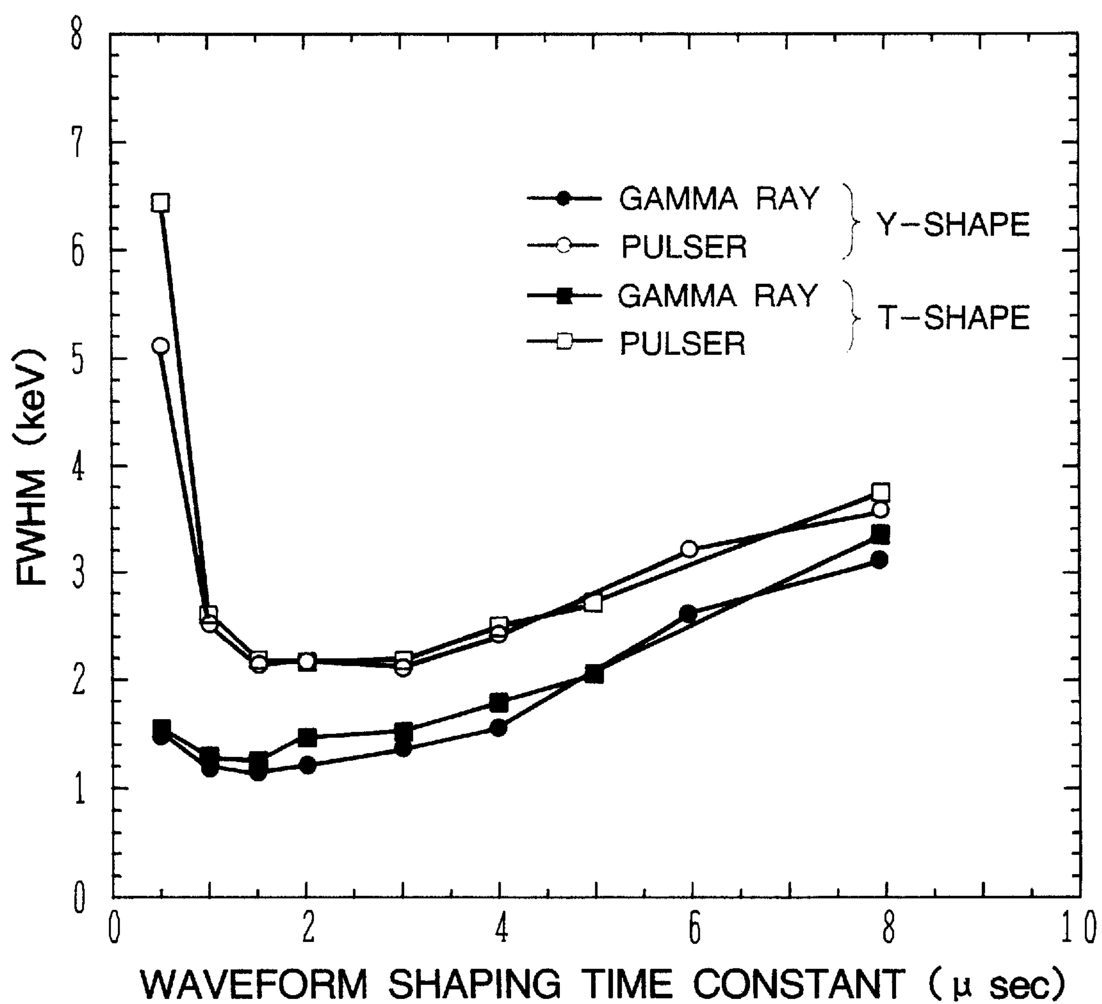
FIG. 11 is a graph showing full widths at half maximum of gamma ray spectra and pulser signal spectra, respectively when the connector of a T-character shape is used and when the connector of a Y-character shape is used.

FIG. 11 is a graph showing full widths at half maximum of gamma ray spectra and pulser signal spectra, when the waveform shaping time constant is changed. A Ge detector of a closed end type having a capacity of 85 $cm^3$ was used as the semiconductor radiation detector, and the Stirling refrigerator was driven at a voltage of 15 V. White and black circles in FIG. 11 represent full widths at half maximum respectively of gamma ray spectra and pulser signal spectra, when the connector of a Y-character shape is used. White and black squares in FIG. 11 represent full widths at half maximum respectively of gamma ray spectra and pulser signal spectra, when the connector of a T-character shape is used. The full widths at half maximum have almost no significant difference between the connectors of the Y-and T-character shapes in the range of 0.5 to 8 $\mu$s of the waveform shaping time constant.

Figure 12:
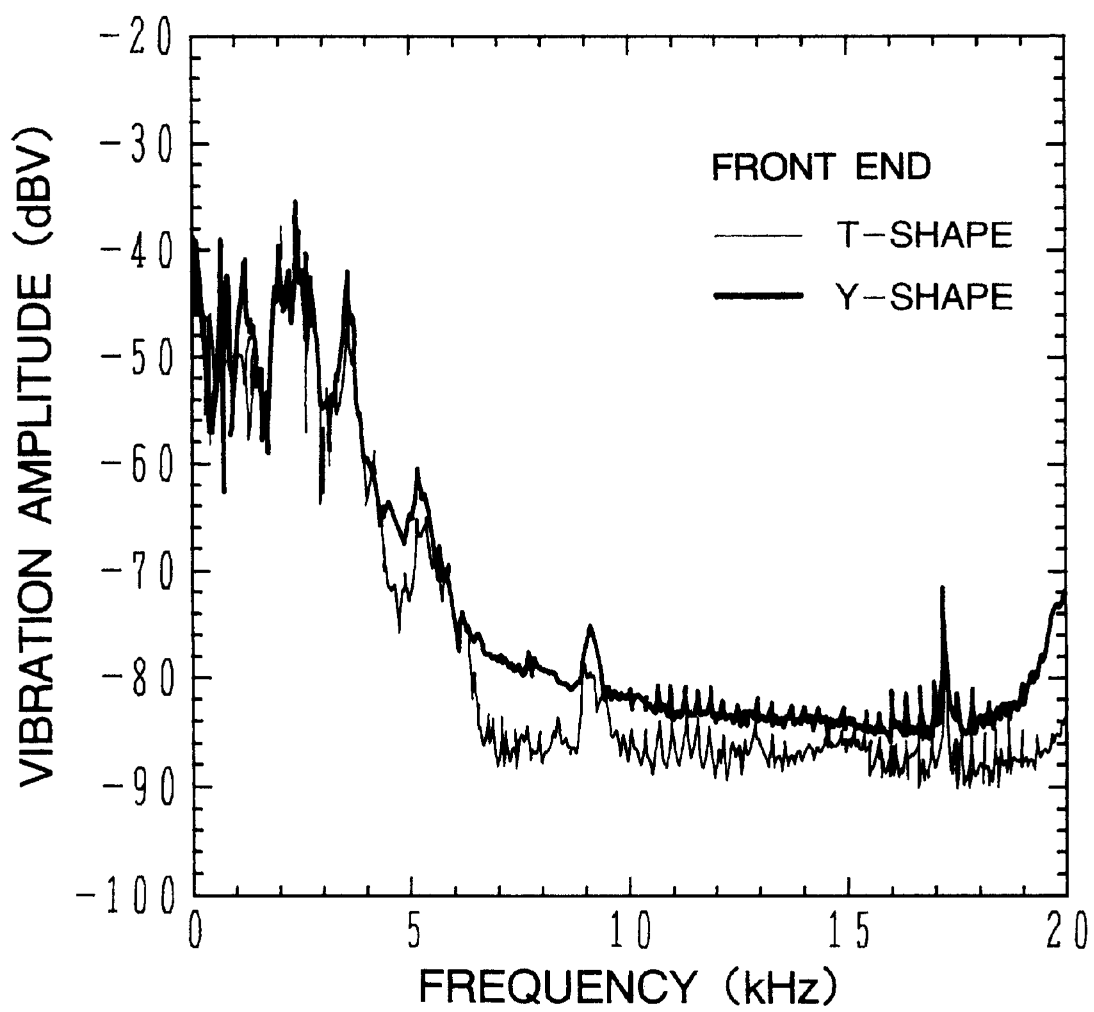
FIG. 12 is a graph showing the amplitudes of vibrations detected by the acceleration sensor mounted on the front end of the semiconductor radiation detector, respectively when the connector of a T-character shape is used and when the connector of a Y-character shape is used.

FIG. 12 shows the amplitudes of vibrations of a radiation detector when the connectors of the T- and Y-character shapes are used. Vibrations detected by the acceleration sensors at the front end, top wall, and side wall showed generally the same tendency. Therefore, only the amplitudes of vibrations detected with the acceleration sensor at the front end are shown in FIG. 12 as typical examples among the front end, top wall, and side wall. For the measurement, a Ge radiation detector of an closed end type having a capacity of 14 $cm^3$ was used.

In the vibration frequency range of 0 to 5 kHz, the amplitudes of vibrations have no significant difference between the T- and Y-character shapes and give generally the same tendency that as the vibration frequency becomes higher, the amplitudes of vibrations are gradually reduced. In the vibration frequency range of 5 kHz or higher, the levels of vibrations for the T-character shape is lower than the Y-character shape. However, since the absolute values thereof are very small, it can be considered that the semiconductor radiation detector is not practically affected by microphonic noises.

Vibrations of semiconductor radiation detectors have no significant practical difference between the connectors having the T- and Y-character shapes. Therefore, generally the same resolution can be obtained both for the T- and Y-character shapes. The shapes are not limited to T- and Y-character shapes, but any other shapes may be used so long as they ensure the reduction of mechanical vibrations. For example, a V-character shape, a straight line shape, or the like may be used.

In the above embodiment, the displacers of two Stirling refrigerators are driven in the same phase. Next, the effects of driving the displacers of two Stirling refrigerators in the opposite phase will be described with reference to the experiments results.

Figure 13:
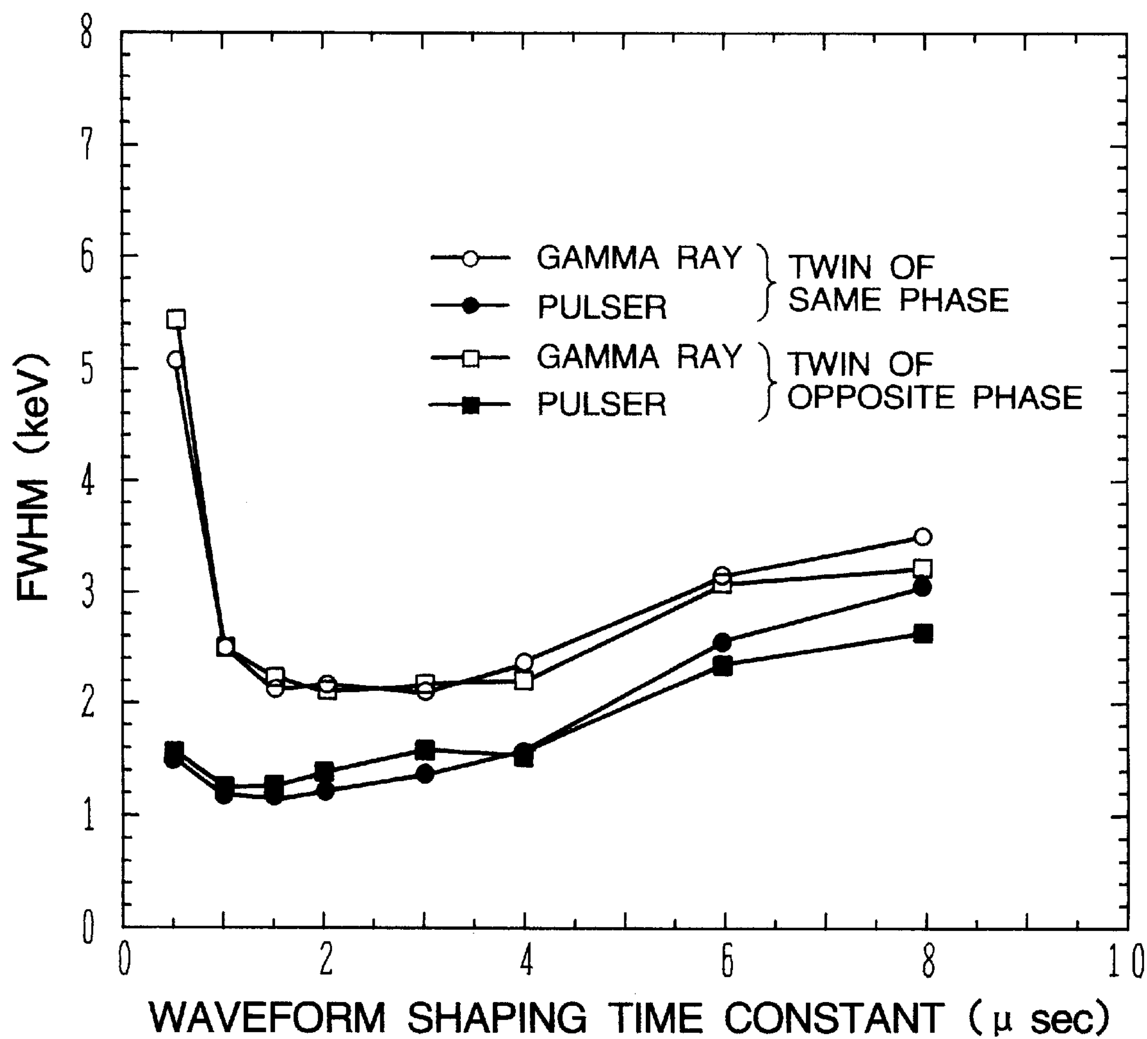
FIG. 13 is a graph showing full widths at half maximum of gamma ray spectra and pulser signal spectra, respectively when two Stirling refrigerators are run in the same phase and in the opposite phase.

FIG. 13 is a graph showing full widths at half maximum of gamma ray spectra and pulser signal spectra relative to the waveform shaping time constant, respectively when two Stirling refrigerators are run in the same phase and in the opposite phase. As the semiconductor radiation detector, a Ge radiation detector of a closed end type having a capacity of 85 $cm^3$ was used. A connector of a Y-character shape was used, and the Stirling refrigerator was driven at a voltage of 12 V. White and black circles in FIG. 13 represent full widths at half maximum respectively of gamma ray spectra and pulser signal spectra, when the Stirling refrigerators are driven in the same phase. White and black squares in FIG. 13 represent full widths at half maximum respectively of gamma ray spectra and pulser signal spectra, when the Stirling refrigerators are driven in the opposite phase.

No significant difference of full widths at half maximum was found between the same phase drive and opposite phase drive.

Figure 14:
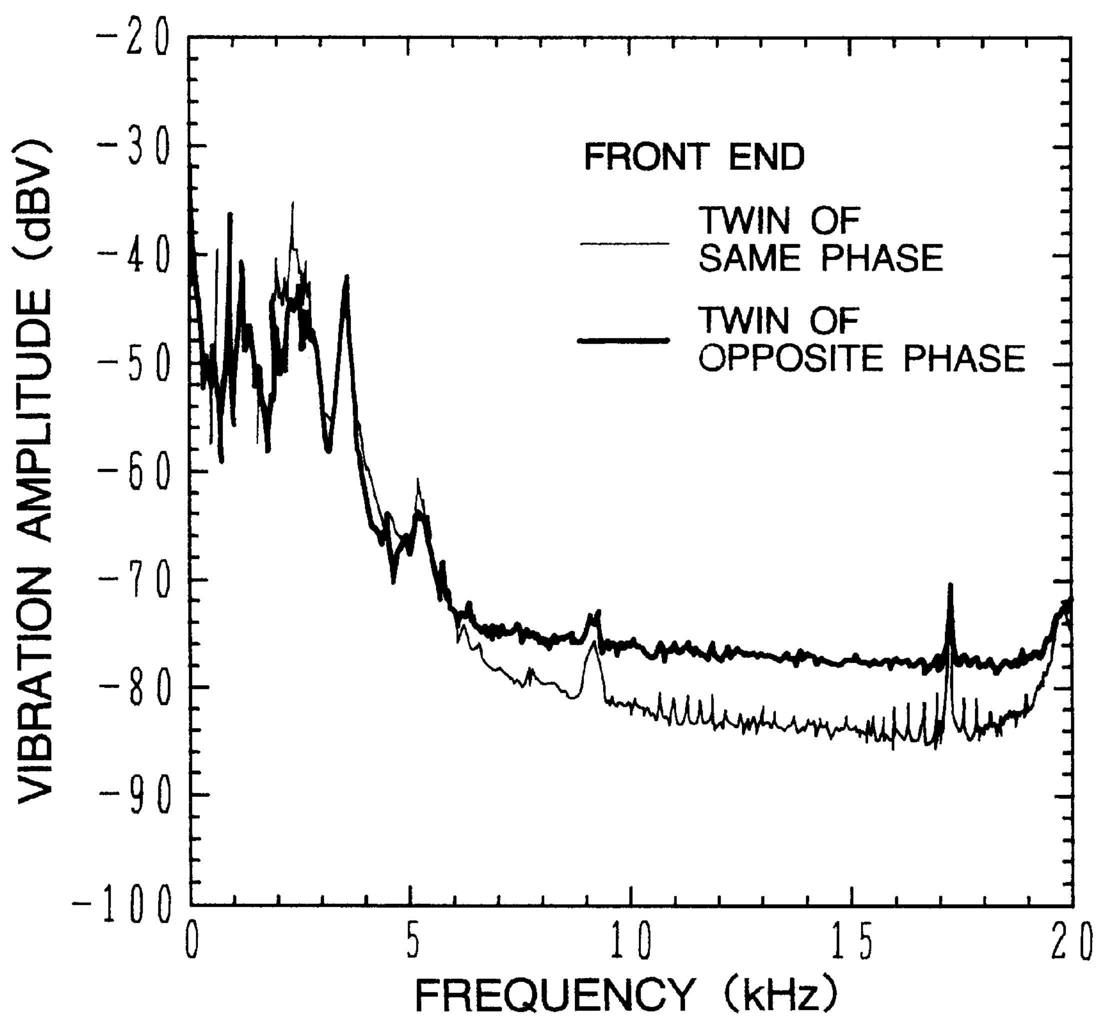
FIG. 14 is a graph showing the amplitudes of vibrations detected by the acceleration sensor mounted on the front end of the semiconductor radiation detector, respectively when two Stirling refrigerators are run in the same phase and in the opposite phase.

FIG. 14 is a graph showing the amplitudes of vibrations of the semiconductor radiation detector, when two Stirling refrigerators are run in the same phase and in the opposite phase. Only the amplitudes of vibrations detected with the acceleration sensor at the front end are shown in FIG. 14 as typical examples among the front end, top wall, and side wall. For the measurement, a Ge radiation detector of an closed end type having a capacity of 14 $cm^3$ was used.

In the vibration frequency range of 0 to 5 kHz, the amplitudes of vibrations have no significant difference between the same phase drive and opposite phase drive. In the vibration frequency range of 5 kHz or higher, vibrations for the same phase drive are smaller than for the opposite phase drive. However, since the absolute values thereof are very small, it can be considered that the semiconductor radiation detector is not practically affected by microphonic noises.

Vibrations of semiconductor radiation detectors have no significant practical difference between the same phase drive and opposite phase drive of two Stirling refrigerators. Therefore, generally the same resolution can be obtained both for the same phase drive and opposite phase drive.

Next, how much the resolution is affected by the size of a semiconductor radiation detector will be described with reference to the experiment results.

Figure 15:
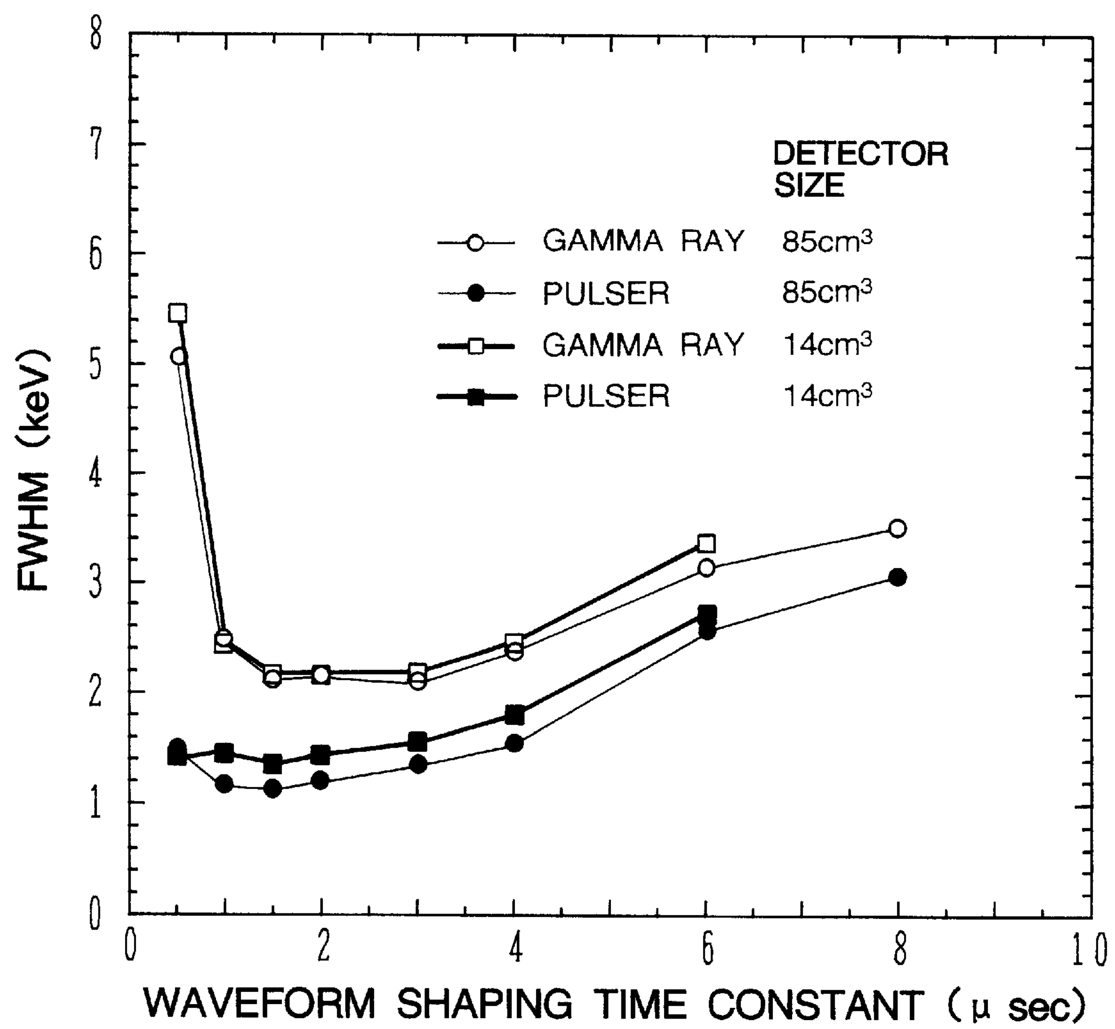
FIG. 15 is a graph showing full widths at half maximum of gamma ray spectra and pulser signal spectra, respectively when a semiconductor radiation detector of 14 $cm^3$ is used and when a semiconductor radiation detector of 85 $cm^3$ is used.

FIG. 15 is a graph showing full widths at half maximum of gamma ray spectra and pulser signal spectra relative to the waveform shaping time constant, when semiconductor radiation detectors having capacities of 14 $cm^3$ and 85 $cm^3$ are used. A connector of a Y-character shape was used, and the Stirling refrigerator was driven in the same phase at a voltage of 12 V. White and black circles in FIG. 15 represent full widths at half maximum respectively of gamma ray spectra and pulser signal spectra, when a semiconductor radiation detector having a capacity of 85 $cm^3$ is used. White and black squares in FIG. 15 represent full widths at half maximum respectively of gamma ray spectra and pulser signal spectra, when a semiconductor radiation detector having a capacity of 14 $cm^3$ is used.

The full widths at half maximum of gamma ray spectra and pulser signal spectra of the radiation detector having a capacity of 85 $cm^3$ were better than the radiation detector having a capacity of 14 $cm^3$, although the difference was small. It has been found that the dependency of the full widths at half maximum upon the waveform shaping time constants are the same for both the radiation detectors having the capacities of 85 $cm^3$ and 14 $cm^3$. It can be considered from these results that frequency spectra of microphonic noises have generally the same tendency.

Figure 16:
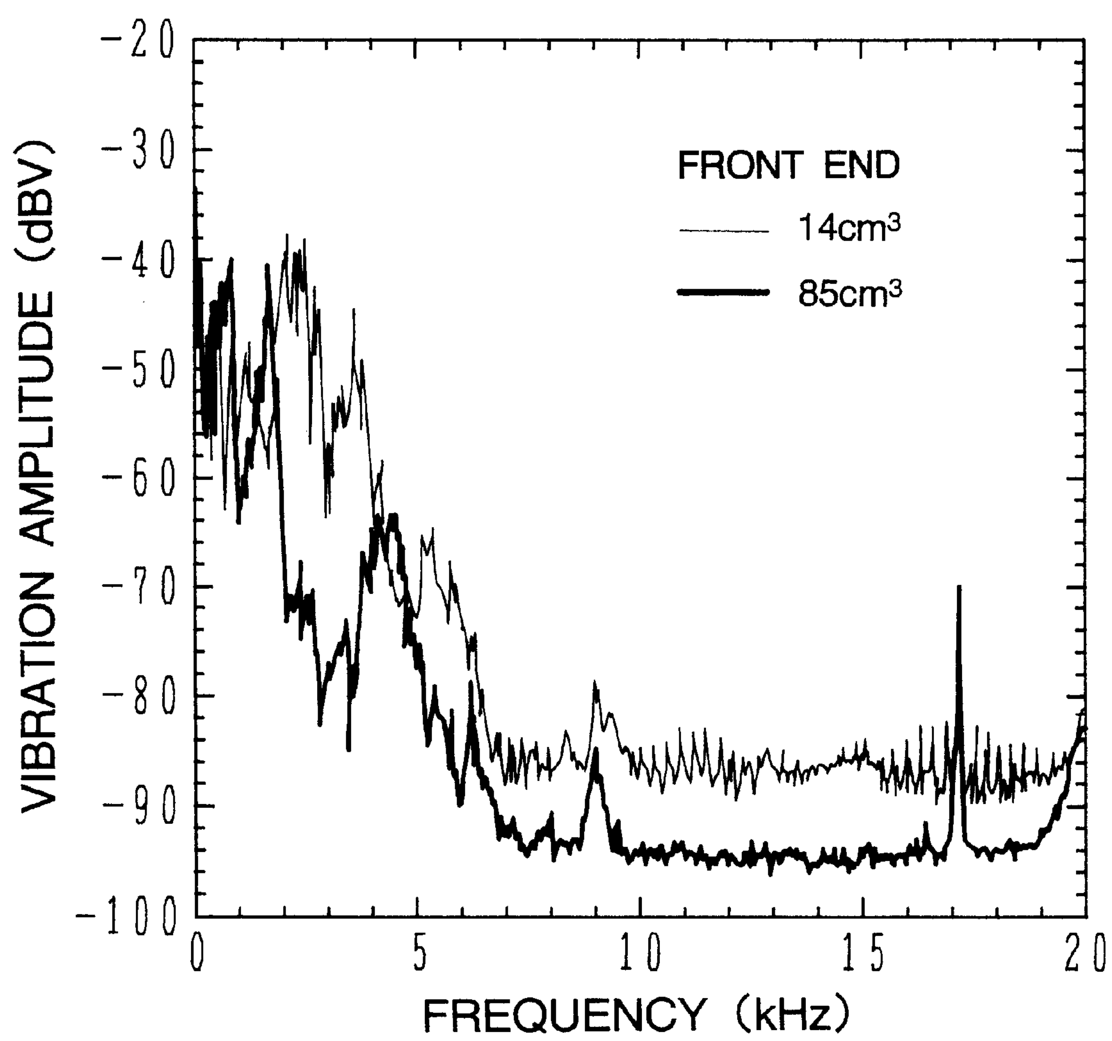
FIG. 16 is a graph showing the amplitudes of vibrations detected by the acceleration sensor mounted on the front end of the semiconductor radiation detector, respectively when a semiconductor radiation detector of 14 $cm^3$ is used and when a semiconductor radiation detector of 85 $cm^3$ is used.
Figure 17:
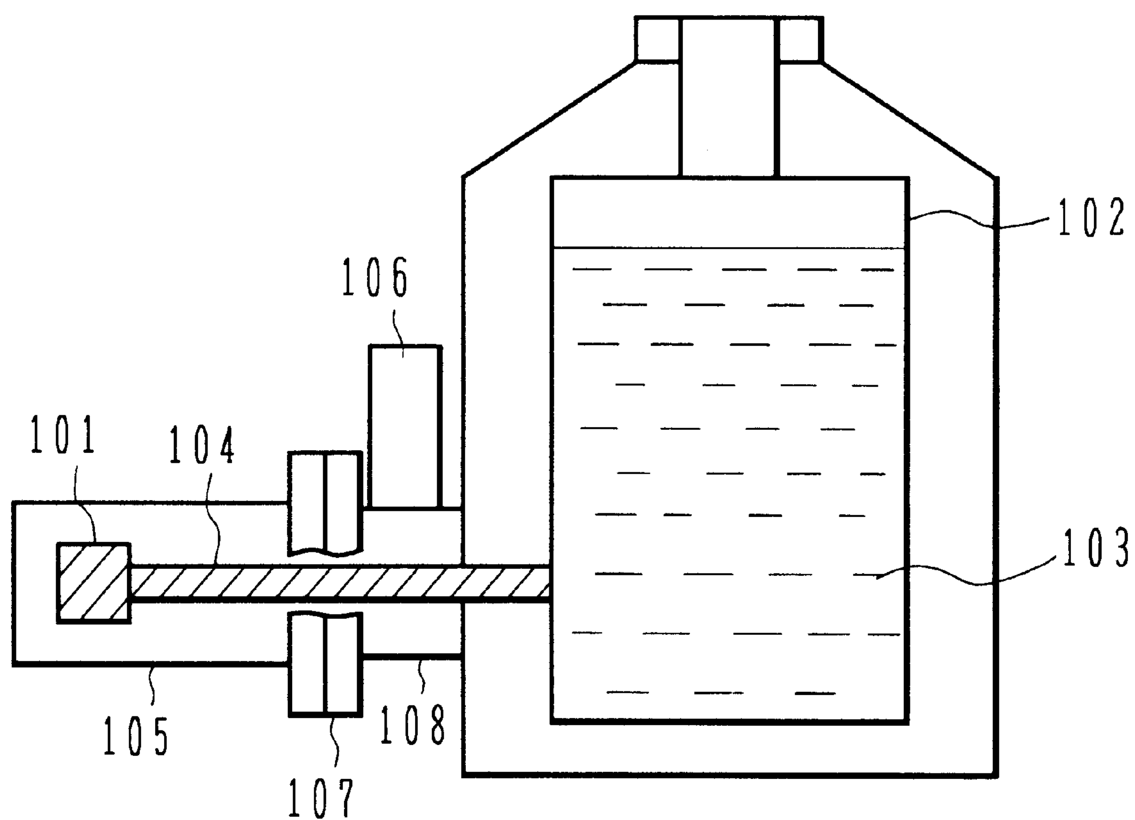
FIG. 17 is a schematic cross sectional view showing a conventional semiconductor radiation detecting system of a liquid nitrogen cooling type.
Figure 18:
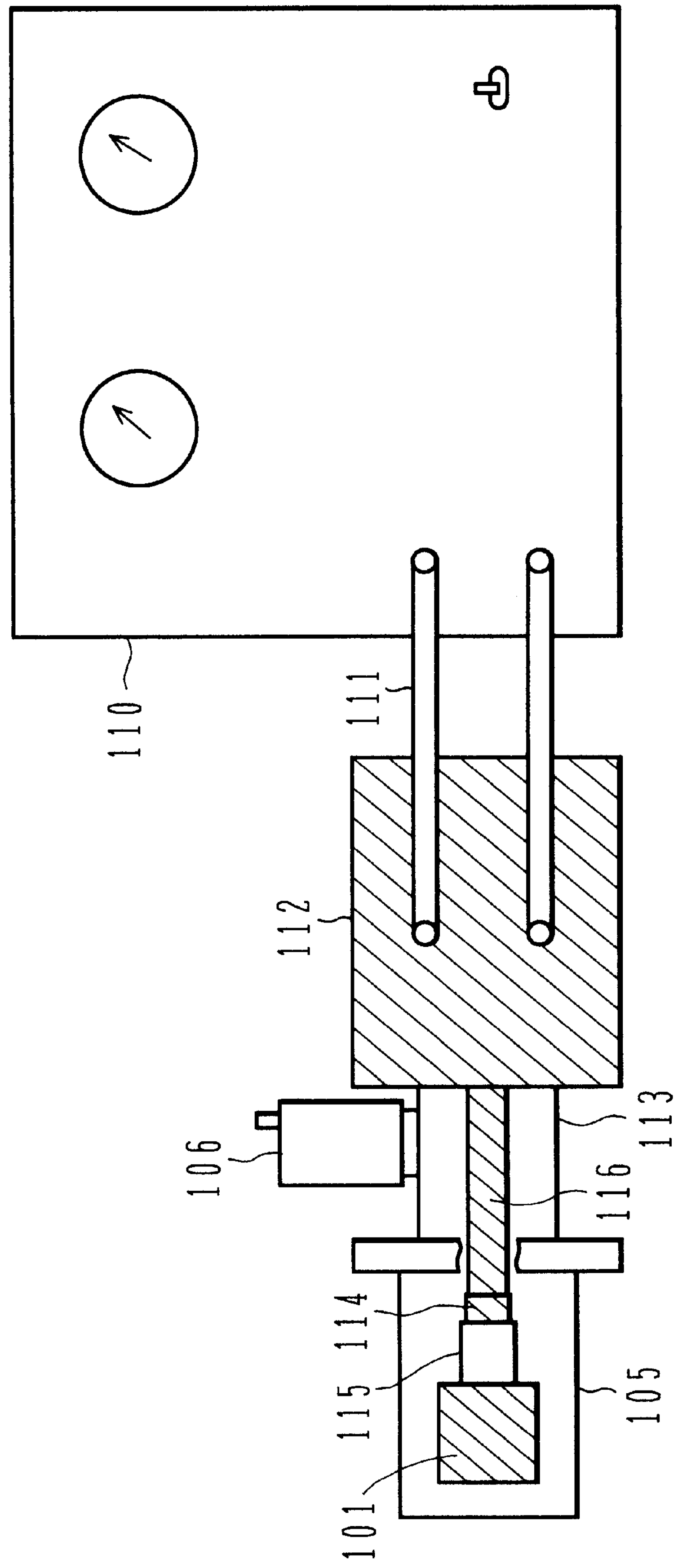
FIG. 18 is a schematic cross sectional view of a conventional semiconductor radiation detecting system using a closed cycle He refrigerator.

FIG. 16 is a graph showing the amplitudes of vibrations of the semiconductor radiation detectors having capacities of 14 $cm^3$ and 85 $cm^3$. Only the amplitudes of vibrations detected with the acceleration sensor at the front end are shown in FIG. 16 as typical examples among the front end, top wall, and side wall. A connector having a Y-character shape was used, and the Stirling refrigerators were driven in the same phase.

In the whole vibration frequency of 0 to 20 kHz, vibrations of the semiconductor radiation detector having a capacity of 85 $cm^3$ are smaller than that having a capacity of 14 $cm^3$.

It can be therefore considered that if the size of a semiconductor radiation detector is made larger, a resolution is improved, although it is small in amount, because mechanical vibrations can be suppressed. However, the twin arrangement reduces mechanical vibrations so that a difference between resolutions is very small. It has been therefore confirmed that there is almost no practical difference between the sizes of semiconductor radiation detectors.

In the above embodiment, as the material of the connector, oxygen free copper or aluminum is used. Other materials may be used if they have a high thermal conductivity and a certain rigidity capable of suppressing vibrations of the cylinders.

In the above embodiment, a semiconductor radiation detector is cooled by Stirling refrigerators in the twin arrangement. Other detectors may also be cooled, such as an infrared detector. Such an infrared detector may be a semiconductor detector or other types of detector.

Also in the above embodiment, the cylinders of two Stirling refrigerators are disposed generally in parallel. The cylinders are not necessarily required to be disposed in parallel. For example, they may be disposed along two straight lines intersecting at a predetermined angle. Two cylinders may be disposed in two slanted sides of an equilateral triangle, with the cooling heads being in substantial contact with each other. The connector may be supported on one side of the holder via a plurality of cylinders. In this case, rigidity is increased and vibrations are further suppressed.

In the above embodiment, although two Stirling refrigerators are used, three or more Stirling refrigerators may be used. In this case, the cooling heads of respective cylinders are disposed along a certain plane and coupled together by the connector, and the isothermal compression parts are disposed on one side of the plane and fixed to the holder. Also in this case, a connector of a shape, for example, a disk shape, may be used so that the cooling heads of three or more Stirling refrigerators can be thermally coupled thereto.

The proper number of Stirling refrigerators is preferably determined depending upon a heat capacity of the object to be cooled, a target cooled temperature, a cooling ability of Stirling refrigerators, and the like. Instead of a Stirling refrigerator, other refrigerators with mechanically moving members may be used.

The present invention has been described in connection with the preferred embodiments. The invention is not limited only to the above embodiments. It is apparent to those skilled in the art that various modifications, modifications, combinations and the like can be made without departing from the scope of the appended claims.

We claim:

1. A detecting system comprising:

two or more heat regenerative refrigerators each having a cylinder with a cooling head at its one end;

a holder for supporting the two or more heat regenerative refrigerators to dispose the one ends of the cylinders along a certain plane and the other ends of the cylinders on one side of the certain plane;

a connector for thermally and rigidly connecting the cooling heads; and a detector being thermally connected to the connector.

2. A detecting system according to claim 1, wherein two heat regenerative refrigerators are used, and the cylinders are disposed in parallel.

3. A detecting system according to claim 2, wherein the connector comprises a straight line portion and a thick portion, the straight line portion being disposed along a straight line interconnecting the one ends, and the thick portion being formed at a central area of the straight line portion, and the detector is mounted on the thick portion.

4. A detecting system according to claim 2, wherein the connector comprises two straight line portions disposed along two slanted sides of an equilateral triangle having two ends of a bottom side located at the one ends of the cylinders, and the detector is mounted on near apex of the equilateral triangle.

5. A detecting system according to claim 1, wherein the detector is a radiation detector.

6. A detecting system according to claim 5, wherein the detector is a semiconductor radiation detector.

7. A detecting system according to claim 1, wherein the detector is an infrared ray detector.

8. A detecting system according to claim 2, wherein the detector is a radiation detector.

9. A detecting system according to claim 8, wherein the detector is a semiconductor radiation detector.

10. A detecting system according to claim 2, wherein the detector is an infrared ray detector.

11. A detecting system according to claim 2, further comprising means for driving the two heat regenerative refrigerators in same phase.

12. A detecting system according to claim 2, further comprising means for driving the two heat regenerative refrigerators in opposite phase.

13. A cooling system comprising:

two or more heat regenerative refrigerators each having a cylinder with a cooling head at its one end;

a holder for supporting the two or more heat regenerative refrigerators to dispose the one ends of the cylinders along a certain plane and the other ends of the cylinders on one side of the certain plane; and a connector for thermally and rigidly connecting the cooling heads.

14. A cooling system according to claim 13, wherein two heat regenerative refrigerators are used, and the cylinders are disposed in parallel.

15. A cooling system according to claim 14, wherein the connector comprises a straight line portion and a thick portion, the straight line portion being disposed along a straight line interconnecting the one ends, and the thick portion being formed at a central area of the straight line portion.

16. A cooling system according to claim 14, wherein the connector comprises two straight line portions disposed along two slanted sides of an equilateral triangle having two ends of a bottom side located at the one ends of the cylinders.

17. A cooling system according to claim 14, further comprising means for driving the two heat regenerative refrigerators in same phase.

18. A cooling system according to claim 14, further comprising means for driving the two heat regenerative refrigerators in opposite phase.

* * * * *